United States Patent
Matzlavi et al.

(10) Patent No.: US 10,649,979 B1
(45) Date of Patent: May 12, 2020

(54) SYSTEM, METHOD, AND COMPUTER PROGRAM FOR MAINTAINING CONSISTENCY BETWEEN A NOSQL DATABASE AND NON-TRANSACTIONAL CONTENT ASSOCIATED WITH ONE OR MORE FILES

(71) Applicant: Amdocs Development Limited, Limassol (CY)

(72) Inventors: Eyal Matzlavi, Ramat-Hasharon (IL); Moshe Yechiel Shtein, Hod Hasharon (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 179 days.

(21) Appl. No.: 15/835,127

(22) Filed: Dec. 7, 2017

(51) Int. Cl.
| | |
|---|---|
| G06F 7/00 | (2006.01) |
| G06F 17/00 | (2019.01) |
| G06F 16/23 | (2019.01) |
| G06F 3/06 | (2006.01) |
| G06F 16/22 | (2019.01) |
| G06F 16/28 | (2019.01) |
| G06F 16/14 | (2019.01) |
| G06F 16/2458 | (2019.01) |

(52) U.S. Cl.
CPC ........ *G06F 16/2365* (2019.01); *G06F 3/0619* (2013.01); *G06F 16/148* (2019.01); *G06F 16/22* (2019.01); *G06F 16/2379* (2019.01); *G06F 16/2471* (2019.01); *G06F 16/28* (2019.01)

(58) Field of Classification Search
None
See application file for complete search history.

(56) References Cited

U.S. PATENT DOCUMENTS

| | | | |
|---|---|---|---|
| 6,493,826 B1 | 12/2002 | Schofield et al. | |
| 9,542,391 B1 | 1/2017 | Eisner et al. | |
| 9,613,122 B2 | 4/2017 | Chao et al. | |
| 9,633,074 B1 * | 4/2017 | Sharma | G06F 16/245 |
| 2002/0194244 A1 | 12/2002 | Raventos | |

(Continued)

FOREIGN PATENT DOCUMENTS

CN 105718572 B 3/2017

*Primary Examiner* — Tuan A Pham
(74) *Attorney, Agent, or Firm* — Zilka-Kotab, P.C.

(57) ABSTRACT

A system, method, and computer program product are provided for maintaining consistency between a NoSQL database and non-transactional content associated with one or more files. In operation, the system identifies one or more files including non-transactional data for maintaining consistency between the non-transactional data and a NoSQL database associated with the system. The system stores the non-transactional data associated with the one or more files in a transaction file. The system stores artifacts associated with the non-transactional data in a file with an ending marker and stores the non-transactional data with a corresponding transaction ID. The system stores data of the transaction file in the NoSQL database associated with the system. The system stores the transactional data with the corresponding transaction ID. The system scans the transaction file utilizing an asynchronous process to locate successful transactions. Moreover, the system distributes the artifacts associated with the successful transactions to their corresponding final locations.

3 Claims, 5 Drawing Sheets

(56) References Cited

U.S. PATENT DOCUMENTS

| | | | |
|---|---|---|---|
| 2015/0172412 A1* | 6/2015 | Escriva | G06F 9/466 |
| | | | 709/202 |
| 2016/0328438 A1 | 11/2016 | Bacalzo et al. | |
| 2017/0052997 A1 | 2/2017 | Eisner et al. | |
| 2017/0132271 A1 | 5/2017 | Jiao et al. | |
| 2017/0161352 A1* | 6/2017 | Horii | G06F 16/28 |
| 2017/0185636 A1* | 6/2017 | Horii | G06F 16/22 |
| 2019/0102418 A1* | 4/2019 | Vasudevan | G06F 16/2358 |

* cited by examiner

SYSTEM, METHOD, AND COMPUTER PROGRAM FOR MAINTAINING CONSISTENCY BETWEEN A NOSQL DATABASE AND NON-TRANSACTIONAL CONTENT ASSOCIATED WITH ONE OR MORE FILES

FIELD OF THE INVENTION

The present invention relates to NoSQL databases, and more particularly to maintaining consistency between a NoSQL database and non-transactional content associated with one or more files.

BACKGROUND

A NoSQL database provides a mechanism for storage and retrieval of data that is modeled in ways other than the tabular relations used in relational databases.

Events are processed in an on-line-transactional-processing (OLTP) system in a Big Data environment resulting in NoSQL database data updates and multiple file outputs used primarily for analytical calculations. Data must be kept coherent at all times as each event is dependent on the outcome of previous events.

Unlike traditional relational database management system (RDBMS) servers, no transaction management tools are available today for NoSQL databases and associated files. Current implementations are forced to compromise between single table updates and providing a correction transaction mechanism.

There is thus a need for addressing these and/or other issues associated with the prior art.

SUMMARY

A system, method, and computer program product are provided for maintaining consistency between a NoSQL database and non-transactional content associated with one or more files. In operation, the system identifies one or more files including non-transactional data for maintaining consistency between the non-transactional data and a NoSQL database associated with the system. The system stores the non-transactional data associated with the one or more files in a transaction file. The system stores artifacts associated with the non-transactional data in a file with an ending marker and stores the non-transactional data with a corresponding transaction ID. The system stores data of the transaction file in the NoSQL database associated with the system. The system stores the transactional data with the corresponding transaction ID. The system scans the transaction file utilizing an asynchronous process to locate successful transactions. Moreover, the system distributes the artifacts associated with the successful transactions to their corresponding final locations.

DETAILED DESCRIPTION

Figure 1:
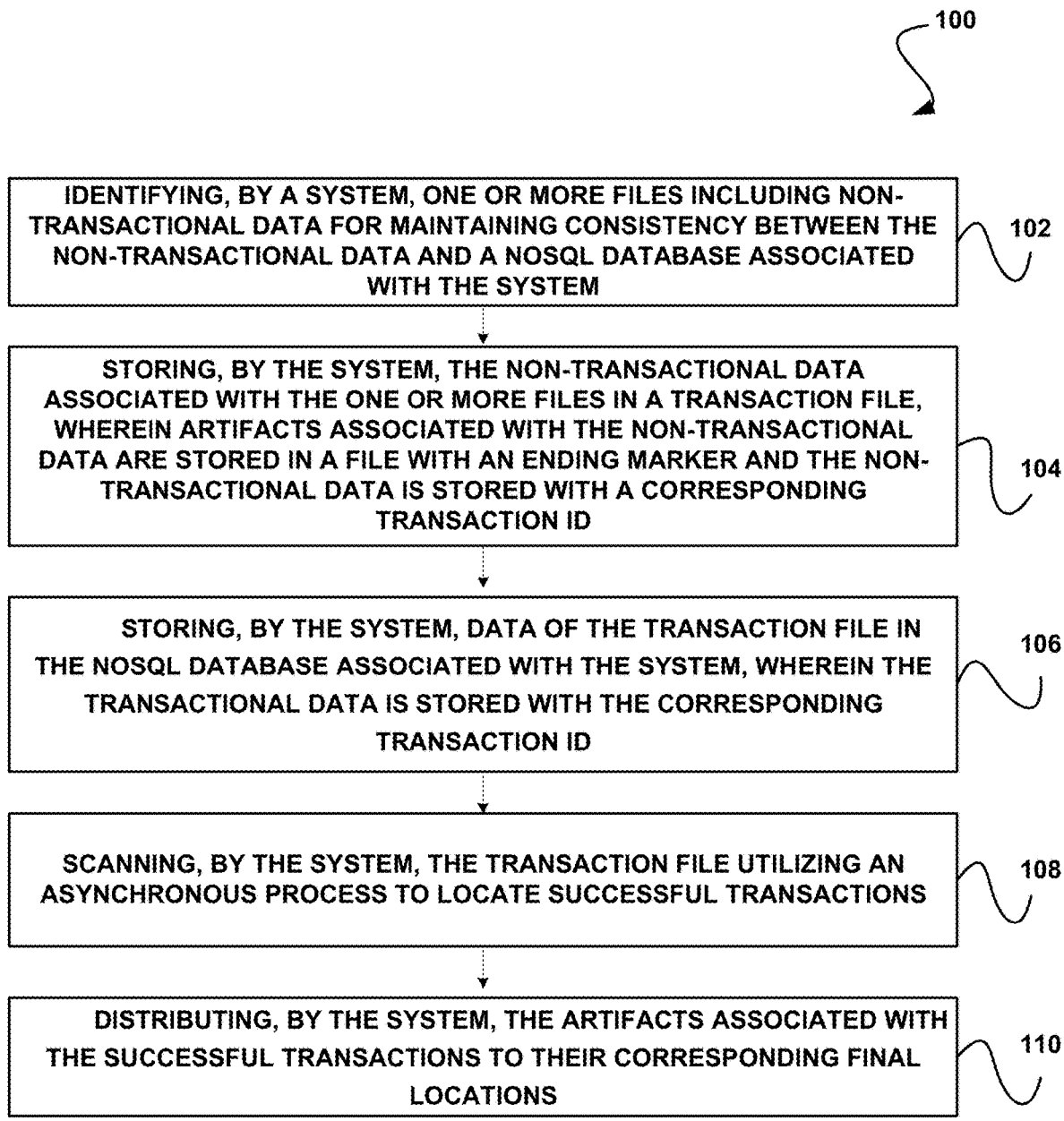
FIG. 1 illustrates a method for maintaining consistency between a NoSQL database and non-transactional content associated with one or more files, in accordance with one embodiment.

FIG. 1 illustrates a method 100 for maintaining consistency between a NoSQL database and non-transactional content associated with one or more files, in accordance with one embodiment.

In operation, the system identifies one or more files including non-transactional data for maintaining consistency between the non-transactional data and a NoSQL database associated with the system. See operation 102. The files may include any type of file that includes non-transactional data.

The system stores the non-transactional data associated with the one or more files in a transaction file. See operation 104. The system stores artifacts associated with the non-transactional data in a file with an ending marker and stores the non-transactional data with a corresponding transaction ID.

In one embodiment, the system may force flush the transaction file to guarantee non-transactional data is secured after storing the non-transactional data in the transaction file. Additionally, in one embodiment, the system may log success status and failure status of a transaction in the transaction file. In one embodiment, the status in the transaction log may be a possible optimization.

The system stores data of the transaction file in the NoSQL database associated with the system. The system stores the transactional data with the corresponding transaction ID. See operation 106. In one embodiment, the system may identify a transaction as committed after storing the data of the transaction file in the NoSQL database.

The system scans the transaction file utilizing an asynchronous process to locate successful transactions. See operation 108. Moreover, the system distributes the artifacts associated with the successful transactions to their corresponding final locations. See operation 110. In one embodiment, the system may function such that a state of each transaction is capable of being determined by querying the NoSQL database.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
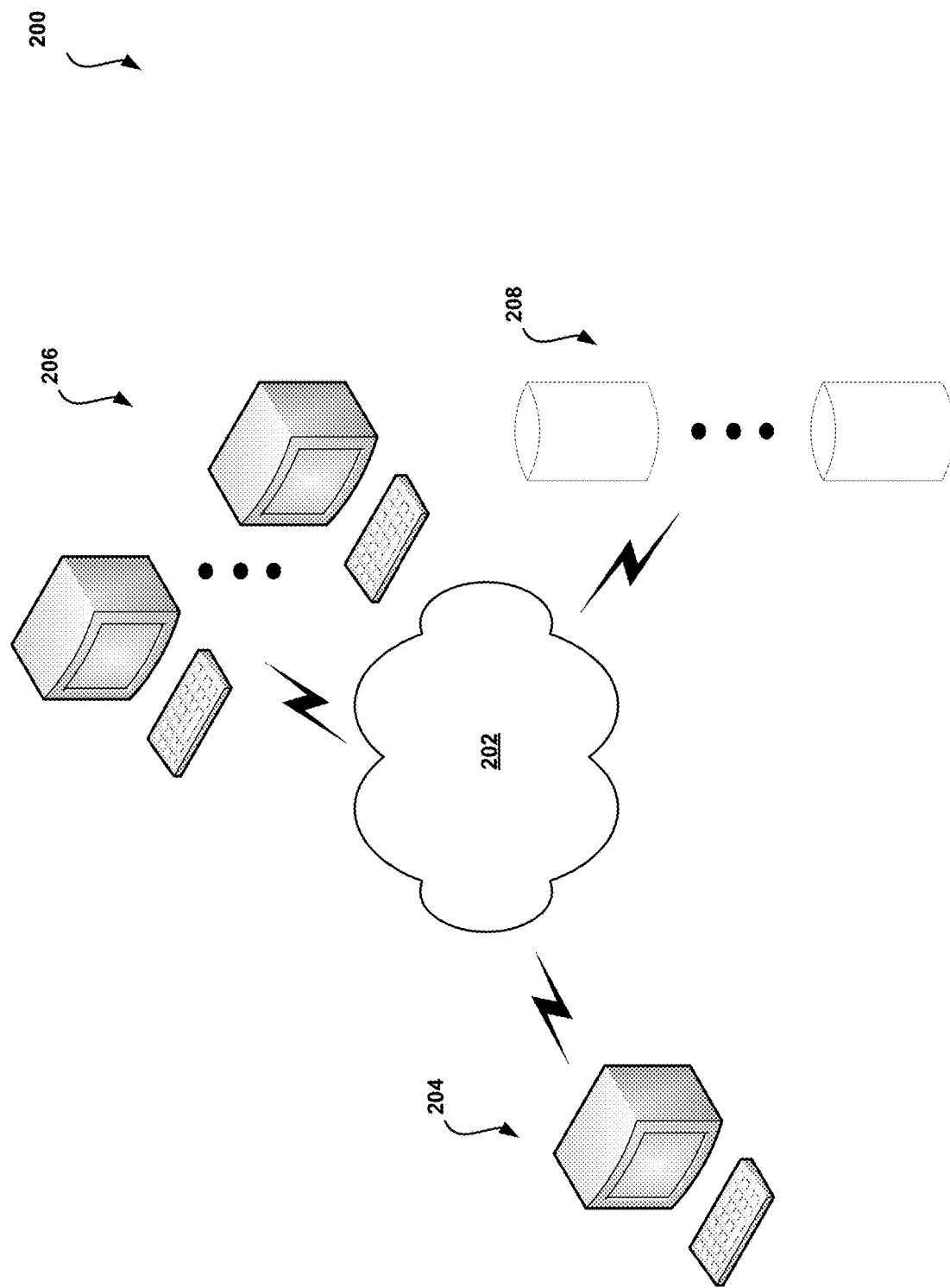
FIG. 2 shows a system for maintaining consistency between a NoSQL database and non-transactional content associated with one or more files, in accordance with one embodiment.

FIG. 2 shows a system 200 for maintaining consistency between a NoSQL database and non-transactional content on files, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for maintaining consistency between a NoSQL database and non-transactional content on files. The system 204 may also be in communication with one or more repositories/databases 208.

A NoSQL database provides a mechanism for storage and retrieval of data that is modeled in means other than the tabular relations used in relational databases.

Events are processed in an on-line-transactional-processing (OLTP) system in a Big Data environment resulting in NoSQL database data updates and multiple file outputs used primarily for analytical calculations. Data must be kept coherent at all times as each event is dependent on the outcome of previous events.

Unlike traditional relational database management system (RDBMS) servers, no transaction management tools are available today for NoSQL databases and associated files. Current implementations are forced to compromise between single table updates and provide a correction transaction mechanism.

To maintain a coherent state, the system 204 functions as a transaction system on non-transactional data stores. The system 204 implements a method for providing eventual consistency between multiple file outputs and a database output.

In operation, the system 204 stores all the non-transactional data in a transaction file. The system 204 stores artifacts in a single data structure with an ending marker. The system 204 stores data with its transaction ID.

The system 204 may force a flush of the file to guaranty the data is secured. The system stores the transactional data in the transactional data store, along with a transaction ID. Once this step is performed, the transaction is considered as committed. In one embodiment, the system 204 may keep the success/failure status of the transaction in the transaction file.

The system 204 then implements an asynchronous process that scans the transaction file and locates the successful transactions. The system 204 may determine the state of each transaction by querying a relevant database (e.g. a database store, etc.) or by locating the status later in the file. The system 204 distributes the stored artifacts of the successful artifacts to their final locations.

Figure 3:
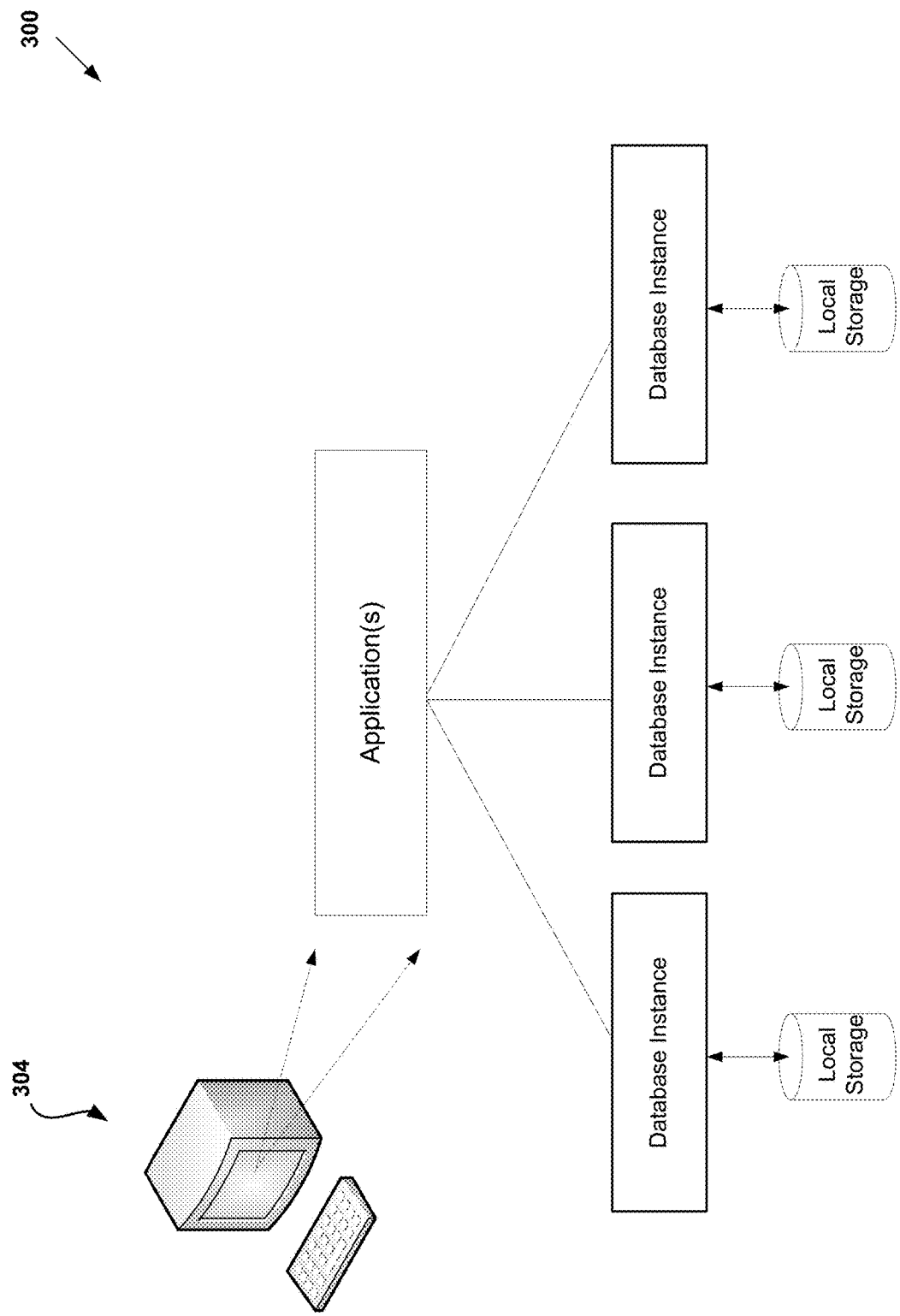
FIG. 3 shows a system flow diagram for maintaining consistency between a NoSQL database and non-transactional content associated with one or more files, in accordance with one embodiment.

FIG. 3 shows a system flow diagram 300 for maintaining consistency between a NoSQL database and non-transactional content associated with one or more files, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

The diagram 300 shows an example of how a system 304 may utilize a NoSQL database. In operation, the system 304 identifies one or more files including non-transactional data for maintaining consistency between the non-transactional data and a NoSQL database associated with the system 304. The system 304 stores the non-transactional data associated with the one or more files in a transaction file.

The system 304 stores artifacts associated with the non-transactional data in a single data structure with an ending marker and stores the non-transactional data with a corresponding transaction ID. The system 304 stores data of the transaction file in the NoSQL database associated with the system.

The system 304 stores the transactional data with the corresponding transaction ID. The system 304 scans the transaction file utilizing an asynchronous process to locate successful transactions. Moreover, the system 304 distributes the artifacts associated with the successful transactions to their corresponding final locations.

The system 304 does not utilize a separate transaction table and stores transaction IDs along with the data. The system 304 does not need to store previous states, and in the case of a rollback, the system 304 does not forward the changes.

The system 304 implements real time transaction processing. Further, the system 304 stores artifacts associated with files that are non-transactional. Additionally, the system 304 functions to maintain consistency between different entities spanning a database and files.

Figure 4:
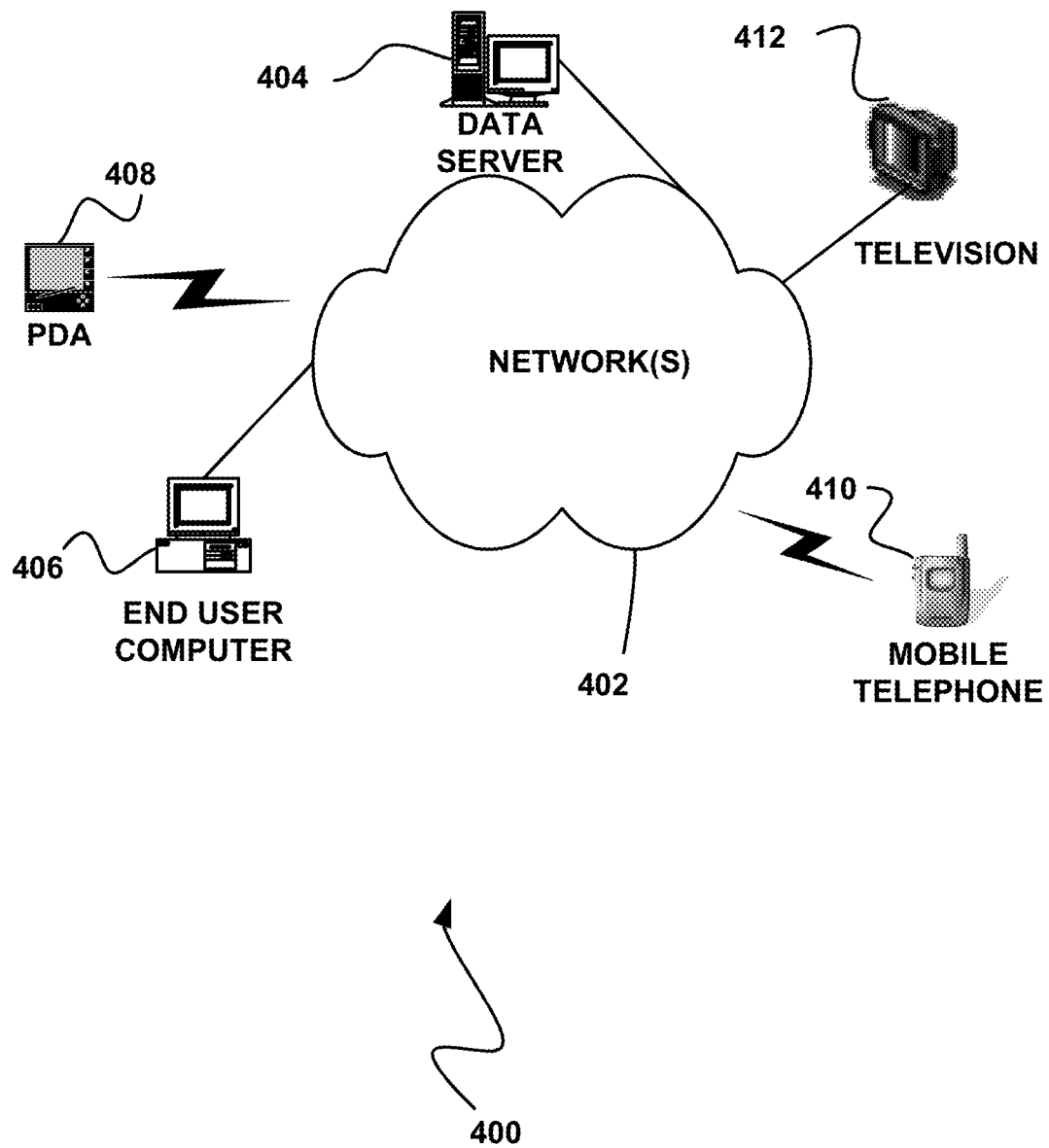
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
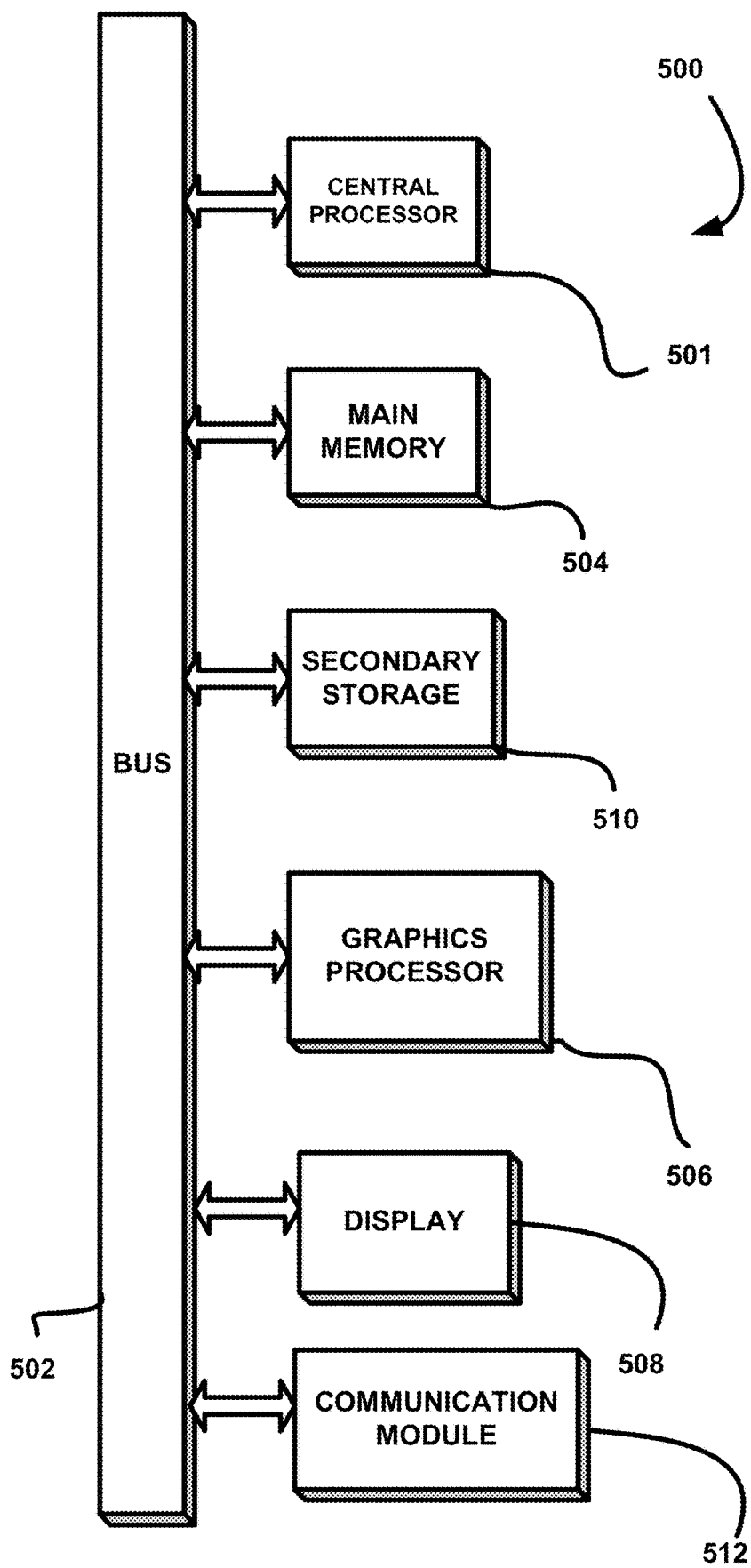
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

identifying, by a system, one or more files including data resulting from events processed in an on-line-transactional-processing (OLTP) system, the events processed in the OLTP system further resulting in updates to the NoSQL database, and the one or more files being identified for maintaining consistency between the one or more files and the NoSQL database;

storing, by the system, the data included in the one or more files as transactional data in a transaction file, wherein artifacts associated with the data are stored in a single data structure with an ending marker and the data is stored as the transactional data with a corresponding transaction ID;

after storing the data in the transaction file, force flushing, by the system, the transaction file to guarantee the data is secured;

storing, by the system, the transactional data of the transaction file in the NoSQL database associated with the system, wherein the transactional data of the transaction file is stored in the NoSQL database with the corresponding transaction ID;

after storing the transactional data of the transaction file in the NoSQL database, identifying, by the system, each associated transaction as committed;

scanning, by the system, the transaction file utilizing an asynchronous process to locate successful transactions from the transaction file, wherein a state of each transaction determined by querying the NoSQL database; and distributing, by the system, the artifacts associated with the successful transactions to their corresponding final locations;

wherein the system logs success status and failure status of each transaction in the transaction file.

2. A computer program product embodied on a non-transitory computer readable medium, comprising computer code for:

identifying, by a system, one or more files including data resulting from events processed in an on-line-transactional-processing (OLTP) system, the events processed in the OLTP system further resulting in updates to the NoSQL database, and the one or more files being identified for maintaining consistency between the one or more files and the NoSQL database;

storing, by the system, the data included in the one or more files as transactional data in a transaction file, wherein artifacts associated with the data are stored in a single data structure with an ending marker and the data is stored as the transactional data with a corresponding transaction ID;

after storing the data in the transaction file, force flushing, by the system, the transaction file to guarantee the data is secured;

storing, by the system, the transactional data of the transaction file in the NoSQL database associated with the system, wherein the transactional data of the transaction file is stored in the NoSQL database with the corresponding transaction ID;

after storing the transactional data of the transaction file in the NoSQL database, identifying, by the system, each associated transaction as committed;

scanning, by the system, the transaction file utilizing an asynchronous process to locate successful transactions from the transaction file, wherein a state of each transaction determined by querying the NoSQL database; and distributing, by the system, the artifacts associated with the successful transactions to their corresponding final locations;

wherein the system logs success status and failure status of each transaction in the transaction file.

3. A system, comprising one or more processors, operable for:

identifying, by the system, one or more files including data resulting from events processed in an on-line-transactional-processing (OLTP) system, the events processed in the OLTP system further resulting in updates to the NoSQL database, and the one or more files being identified for maintaining consistency between the one or more files and the NoSQL database;

storing, by the system, the data included in the one or more files as transactional data in a transaction file, wherein artifacts associated with the data are stored in a single data structure with an ending marker and the data is stored as the transactional data with a corresponding transaction ID;

after storing the data in the transaction file, force flushing, by the system, the transaction file to guarantee the data is secured;

storing, by the system, the transactional data of the transaction file in the NoSQL database associated with the system, wherein the transactional data of the transaction file is stored in the NoSQL database with the corresponding transaction ID;

after storing the transactional data of the transaction file in the NoSQL database, identifying, by the system, each associated transaction as committed;

scanning, by the system, the transaction file utilizing an asynchronous process to locate successful transactions from the transaction file, wherein a state of each transaction determined by querying the NoSQL database; and distributing, by the system, the artifacts associated with the successful transactions to their corresponding final locations;

wherein the system logs success status and failure status of each transaction in the transaction file.

* * * * *